United States Patent
Coyle et al.

(10) Patent No.: US 6,528,102 B1
(45) Date of Patent: Mar. 4, 2003

(54) FRUIT SNACKS WITH VARIED CENTER FILLING

(75) Inventors: Sylvia Coyle, Bethlehem, PA (US); Brian Morse, Chattanooga, TN (US); John Flanyak, Chicago, IL (US); Charlie Fox, Signal Mountain, TN (US)

(73) Assignee: Brach's Confections, Inc., Chattanooga, TN (US)

( * ) Notice: Subject to any disclaimer, the term of this patent is extended or adjusted under 35 U.S.C. 154(b) by 0 days.

(21) Appl. No.: 09/388,214

(22) Filed: Sep. 1, 1999

(Under 37 CFR 1.47)

Related U.S. Application Data

(60) Provisional application No. 60/098,789, filed on Sep. 1, 1998.

(51) Int. Cl.[7] .......................... A23L 1/05; A23L 1/0522; A23L 1/0524
(52) U.S. Cl. ...................... 426/103; 426/104; 426/282; 426/512; 426/516; 426/660
(58) Field of Search ................................. 426/103, 104, 426/282, 512, 516, 660

(56) References Cited

U.S. PATENT DOCUMENTS

| | | | |
|---|---|---|---|
| 4,229,484 A | 10/1980 | Steel et al. ................. 426/279 |
| 4,301,178 A | 11/1981 | Witzel et al. ................... 426/5 |
| 4,355,050 A * | 10/1982 | Butland ....................... 426/615 |
| 4,450,179 A * | 5/1984 | Vink et al. ................... 426/103 |
| 4,466,983 A | 8/1984 | Cifrese et al. .................. 426/5 |
| 4,517,205 A * | 5/1985 | Aldrich ....................... 426/103 |
| 4,614,658 A | 9/1986 | Wilson et al. ............... 426/103 |
| 4,683,138 A | 7/1987 | Glass et al. ..................... 426/5 |
| 4,812,318 A | 3/1989 | Finkel .......................... 426/94 |
| 4,988,518 A | 1/1991 | Patel et al. ...................... 426/5 |
| 5,330,835 A | 7/1994 | Kikuchi et al. .......... 428/402.22 |
| 5,385,744 A | 1/1995 | Cain et al. ..................... 426/89 |
| 5,409,719 A | 4/1995 | Cain et al. .................. 426/103 |
| 5,500,234 A | 3/1996 | Russo ......................... 426/103 |
| 5,571,547 A | 11/1996 | Serpelloni et al. .......... 426/103 |
| 5,578,336 A | 11/1996 | Monte .......................... 426/76 |
| 5,626,896 A | 5/1997 | Moore et al. ................ 426/103 |
| 5,709,895 A | 1/1998 | Tanaka et al. ................. 426/96 |

* cited by examiner

*Primary Examiner*—Helen Pratt
(74) *Attorney, Agent, or Firm*—Miller & Martin LLP; Stephen J. Stark

(57) ABSTRACT

Processes are for the co-deposition of a two component fruit snack confection including a fruit snack material jacket and a distinct center filling and the resulting products. In at least one embodiment, the center filling is jam like and is jelled in part by the action of pectin in the presence of food grade acid. The process utilized incorporates mass flow meters to monitor the specific gravities of the jacket and center filling to keep for the specific gravities of the center material and the jacket substantially the same and the creation of the multicomponent fruit snack.

20 Claims, 3 Drawing Sheets

FRUIT SNACKS WITH VARIED CENTER FILLING

This application claims the benefit of provisional application No. 60/098,789 filed Sep. 1, 1998.

FIELD OF THE INVENTION

The present invention relates to confections known as fruit snacks, and in particular to the process of filling of fruit snacks with a soft, or otherwise varied, filling consisting of a low viscosity, jam-like, or other substance.

BACKGROUND OF THE INVENTION

In the art of candy making, a product category has developed under the name fruit snacks. These products typically contain a combination of fruit juices from concentrates, corn syrup, sugar, corn starch or other food starches, gelatin, pectin, sorbitol, acid, artificial colors, natural and artificial flavorings and other minor ingredients. Fruit snacks are generally marketed as a confection for children especially via the species of gummy candies; however, these snacks are often consumed by adults as well. Continual efforts are directed toward producing variations in fruit snack products' taste, texture, and play value. For instance, efforts are directed towards improving the fruit flavor of the fruit snack products and even injecting two different flavors into adjoining sections of a single mold producing both color and flavor variations. In addition, the texture of various products may range from a rather resilient and chewy texture as is exemplified by gummy candies, to a somewhat sticky and taffy-like texture, or to an easily chewed confection. In addition, play value is enhanced by molding fruit snacks into various shapes, often characters from popular children's entertainment shows, or ring shapes which permit the stringing of the fruit snack confections. Fruit snacks are also produced in string and roll forms which provide other play alternatives.

Several filled product types are known in the art.

One filled product is disclosed by U.S. Pat. No. 4,450,179 which discloses the extrusion of a hollow rope into which a core portion is simultaneously extruded. Nevertheless, this reference does not disclose a method of sealing the ends of the candy product produced. Another filled product is disclosed in U.S. Pat. No. 4,517,205: a two-component hard candy product having a softer inner portion. One other product of interest is disclosed in U.S. Pat. No. 5,330,835 which teaches a seamless capsule and process of manufacture wherein an intermediate layer separates an outer film layer from a central core. Also U.S. Pat. No. 4,614,658 discloses a hard sugar candy outer shell encasing a center filling made of a viscous liquid. This reference discloses that a traveling candy rope is rapidly pinched off into small pieces of the desired size which are then rapidly molded into the desired shape by automatic dies. The pinching and molding operations have the effect of sealing the center filling within the hard candy outer shell.

A need exists for additional modification of fruit snack confection tastes, textures, and structures. By the present invention, fruit snacks are provided with a conventional jacket and a varied center, which provides the opportunity for a two flavor sensation in addition to a texture variation between the jacket and center filling. These fillings may consist of a jam-like filling or a liquid filling but are not limited to these types. Other non-fruit based jackets, such as a licorice or yogurt based jacket, may also be used to encapsulate varied center fillings, usually of relatively lower viscosity.

Furthermore, a need exists to provide for a candy having a center fill of greater than 10% by weight, and typically 12–18% by weight or even greater than 20%, wherein the extruder seals the center within the jacket material without the need for other machinery.

SUMMARY OF THE INVENTION

Accordingly, it is an object of the invention to provide fruit snack confections with a jacket consisting of a previously known fruit, yogurt, or licorice based composition and a relatively lower viscosity center filling consisting of at least juice-like and jam-like fillings.

It is a further object of the invention to be able to produce fruit snack confections with a center filling with different flavors, viscosities, and textures from the jacket utilizing both jacket material and center filling material in a flowable and depositable form during the manufacturing process.

Another objective of this invention is to be able to utilize the similarities in the specific gravities of the jacket and center materials to control the placement of the varied center material withing the jacket.

Still another objective of this invention is the utilization of instrumentation to monitor and control particular portions of the confection manufacturing process.

It is yet another object of the invention to manufacture fruit snack confections with a low viscosity center filling utilizing standard confection manufacturing technologies with only minor modifications.

For a better understanding of the present invention, together with other and further objects, reference is made to the following description, taken in conjunction with the accompanying drawings, and its scope will be pointed out in the ensuing claims.

DETAILED DESCRIPTION OF THE INVENTION

The general process for manufacturing snack pieces taught herein involves the preparation of at least two liquid snack materials, which may contain a combination of fruit juices (usually from concentrates) and/or fruit purees, corn syrup, high fructose corn syrup, sugar, corn starch or other food starches, gelatin, pectin, sorbitol, acid, sodium citrate, natural and/or artificial colors, natural and/or artificial flavorings, and other minor ingredients possibly including buffers, vitamins, preservatives and nutrients. The liquid fruit snack materials are then placed in a dispensing apparatus. A tray or other receiving device, typically containing corn starch or other food starch materials, is stamped with a mogul to create impressions forming a confection mold in the base starch material. The impressions are usually shaped in the form of fruits, animals, children's characters, and other well known objects. The dispensing apparatus then fills the impressions with the liquid fruit snack materials. The filled starch trays may then be set aside for approximately 24 to 48 hours so that the gelatin, pectin and other materials can solidify at least the jacket of the deposited fruit snack materials. Afterwards, the fruit snack confections are separated from the starch material, and packaged. The clean portions of the starch materials may be recycled into further starch trays to receive further impressions from a mogul.

Figure 1:
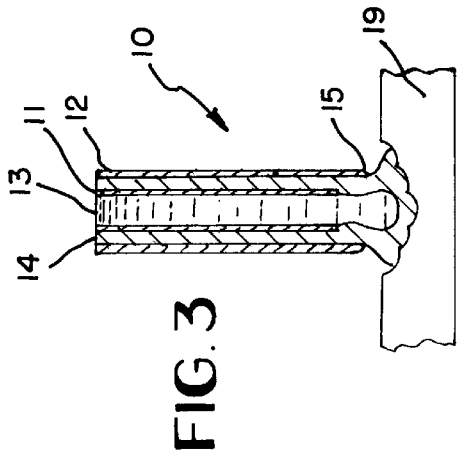
FIG. 1 shows the initiation of the co-deposition of an embodiment of a fruit snack confection according to the present invention by a cross sectional view of a core and shell depositor and confection mold.

According to the presently preferred embodiment of the invention, as shown in FIG. 1, impressions 18 are created in a starch based material 19 to be filled. The dispensing apparatus consists of a center and shell depositor type equipment, typically employing a co-extrusion nozzle or die head. Known manufacturers of such equipment include Werner Makat GmbH, NID Pty, Ltd., and Winkler Dunnebier GmbH. Other manufactures of extruders are believed to include American Chocolate Mould Co., Bueler, BEEPEX, Baker, APV and AMP. Illustrated in FIG. 1 is a sectional view of concentric co-deposition nozzle 10 having an outer nozzle 12 which conveys jacket material 14. Within the outer nozzle 12 is an inner nozzle 11 which conveys center filling material 13. The outer nozzle 12 typically communicates with an outer piston, not shown, which moves between a first and a second position to deposit the jacket material 14. The inner nozzle typically communicates with an inner piston, also not shown, which moves between a first and a second position to deposit the center material 13.

This center filling material 13 may consist of, but is not limited to the following: fruit filling material which may contain fruit juices, sugar, corn syrup, gelatin, pectin, acid, artificial colors, natural and artificial flavors, and other minor ingredients; and liquid filling which may contain sweetener, corn syrup, sorbitol, water, acid, natural and artificial flavoring, and other minor ingredients. The sugar and corn syrup may be added in solution form as a soft candy premelt. Other liquid materials and other ingredients may also be utilized in the center filling material 13.

Figure 8:
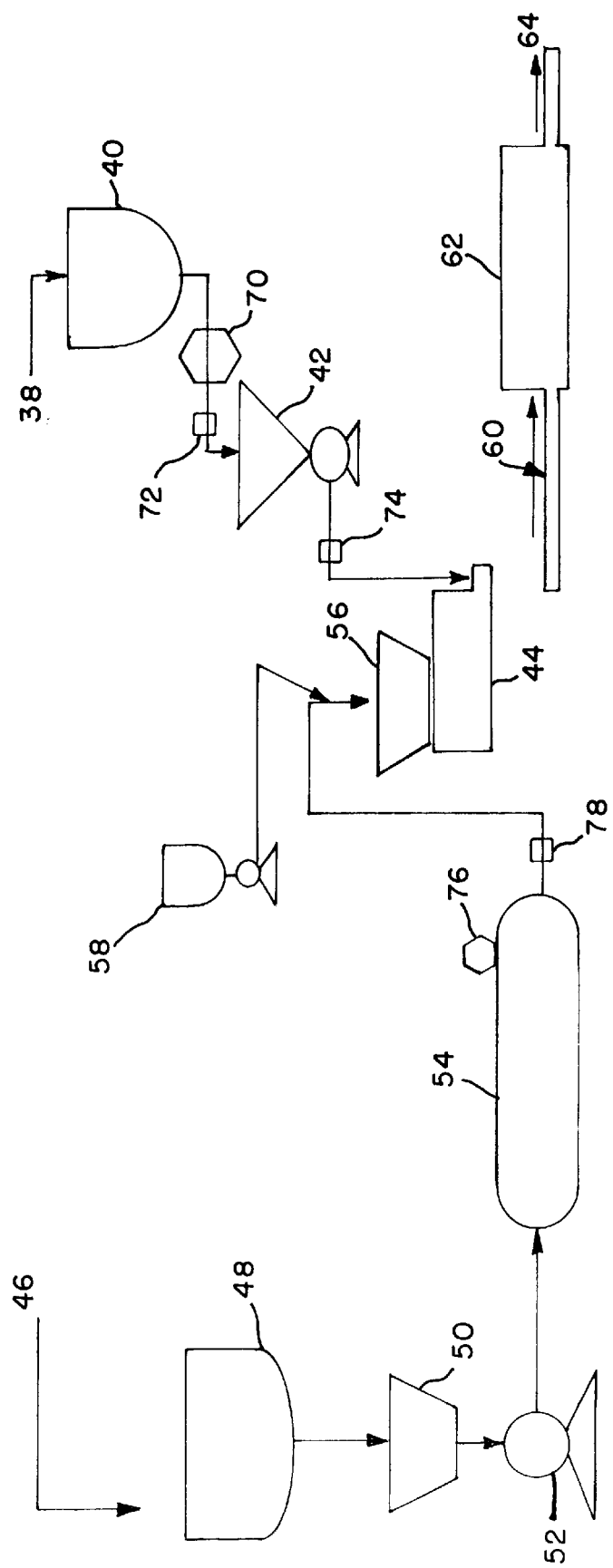
FIG. 8 is a flow chart showing a preferred embodiment of preparing the center and jacket materials of the present invention for deposit or extrusion.

The filling materials should be metered and measured according to a precise formula or I g recipe. Preferably, automated instrumentation is utilized to measure, record and control values for flow rate, temperature, pressure, specific gravity, and other variables at various points along the process as illustrated in FIG. 8. Weighing scales, measuring cups and fluid meters are helpful in adding the center filling ingredients 38 to a kettle 40 (shown in FIG. 8) or other container. A computer may be utilized to assist in the addition of ingredients. Once added and mixed, if necessary, in a kettle 40, the center filling ingredients are cooked to 60%–85% solid content. The temperature of the kettle 40 is carefully controlled as it directly affects the solids content and resulting specific gravity of the center filling. For the filled snacks, cooking the center filling material to about 77% solids has been found to be effective. Steam is a preferred heat source for the kettle 40 and can achieve a temperature of approximately 455° F. for some fillings, however, other heat sources could be utilized as well.

After cooking the materials may be transported though a vacuum chamber 70 to remove any air bubbles and continue evaporation of liquids at lower temperatures. The vacuum chamber 70 may be utilized to fine tune to the desired solid content and specific gravity of the center filling 13. The vacuum in the vacuum chamber 70 may be manually adjusted or automatically controlled by a computer.

The solid content may be verified utilizing the mass flow meter 72. The center materials may then be sent to a mogul hopper 42 where the temperature is set preferably between about 86° F. and about 160° F. Flavor, food grade acid and/or other ingredients may be added to center filling material 13 prior to sending the material to the hopper 42. A computer may control the addition of at least some of these ingredients. Flavor has been found to be effectively added to the mixture at temperatures less than 200° F. Food grade acid for gelling purposes has been found to be most effectively added immediately before use in at least some fruit center types. From the hopper 42, center filling material 13 is sent to the inner nozzle 11 of deposition nozzle 10 of the depositor or extruder 44. The center filling material 13 sent to the deposition nozzle is preferably monitored by an analog mass flow meter 74 to record a center filling specific gravity. This value is then preferably sent to a computer for processing. This value sent to the computer may be updated at any time period or interval as desired, such as several times a second or any other period desired. Alternatively, the specific gravity may be monitored by a human operator.

The jacket material 14 is preferably a combination of corn syrup, fruit juice concentrates, sugar, gelatin, starch, pectin, sorbital, food acids, colors, flavorings, high fructose corn syrup, sodium citrate, and other minor ingredients. The jacket material ingredients 46 may be mixed in a mixer 48, or other device. Ingredients may be added to the mixer 48 utilizing load cells, preweighed additions, powder feeders, pumps or by any other method. The ingredient addition process may be at least partially automated. The mixer 48 mixes and preferably preheats the ingredients to approximately 200° F., preferably about 190° F. Color and other minor ingredients may be added at this time as well. A computer may control the addition of at least some ingredients.

The ingredients are then cooked to 60% to 85% solids, preferably to about 77% solids. One method utilized allows for the jacket material 14 to be transferred from the mixer 48 to the pump hopper 50. From the pump hopper 50, the jacket material 14 will go to the feed pump 52 where it is transferred to the cooker 54, preferably with temperature and pressure gages. The jacket material 14 will then be cooked, preferably with steam heat, at a range of about 220° F.–about 280° F., such as at about 259° F. A back pressure valve 76 may be utilized to control pressure in the cooker 54 which may be utilized along with the cooking temperature to control the specific gravity of the jacket material 14. The back pressure valve 76 may be controlled manually or by a processor, a computer. Furthermore cooking the jacket material 14 in a vacuum has been found effective for some types of jacket materials.

Once cooked, the jacket material 14 is transferred to an extruder hopper 56 having metered flavor added to the jacket material in the process, preferably from a device such as a flavor metering pump 58. Furthermore, juice, acid, vitamins, and color may be added to the jacket material 14 shortly before deposition as well. From the extruder hopper 56, the jacket material 14 may have its specific gravity monitored preferably by an analog mass flow meter 78 which outputs to a computer. The computer may then process the value of the jacket material specific gravity. The extruder hopper 56 is connected to a coextruder. The jacket material may be transferred to the outer nozzle 12 of the deposition nozzle 10 of the coextruder at this point.

While the jacket material 14 is transferred to the outer nozzle 12 of the deposition nozzle 10, the center filling material 13 is transferred to the inner nozzle 11. This allows for the co-extrusion process through co-extrusion die as described herein. The specific gravities of the center material and the jacket material are maintained within 2% of one another, and preferably within 1%, during the deposition process. The computer may control ingredient addition, cooking times, cooking temperatures, pressures or other sub processes in order to keep the specific gravities of the components within the desired range. The operator or computer controls should begin making adjustments to the process when the specific gravities vary by no more than 0.5%, and preferably no more than 0.25%, from one another.

Figure 2:
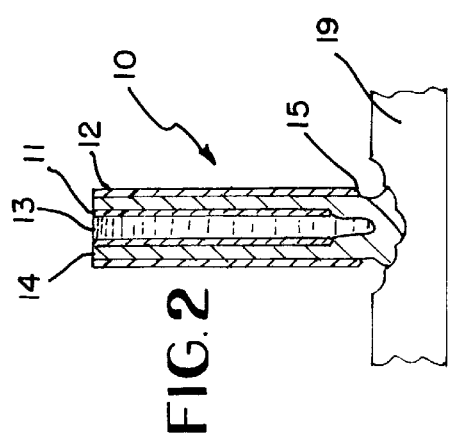
FIGS. 2 through 5 depict the sequential co-deposition of a confection having a fruit snack jacket with a distinct center filling components as it is formed in a starch impression confection mold.
Figure 3:
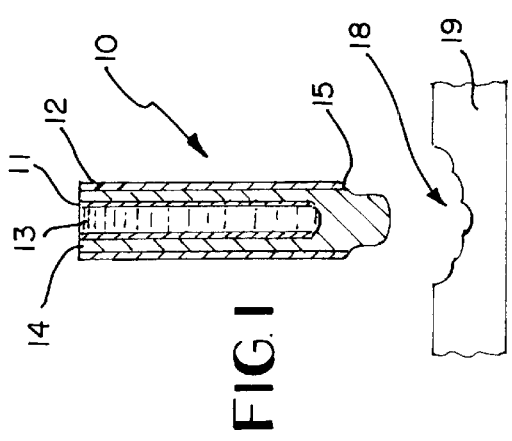
Figure 4:
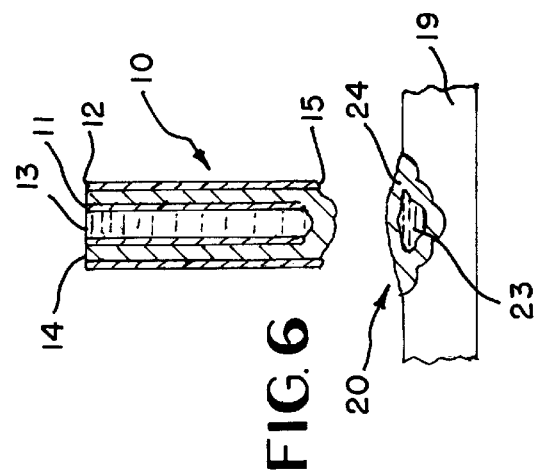
Figure 5:
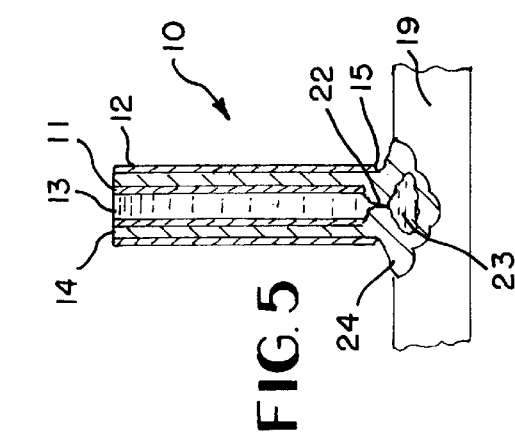

As shown in FIG. 1, the fruit snack jacket material 14 first begins to be deposited. Preferably the depositing nozzle 10 is positioned close to the impression 18 to be filled as shown in FIGS. 2 through 5. Subsequently, the fruit filling material 13 begins to be deposited as shown in FIG. 2. FIG. 3 shows the outer jacket material 14 spreading along the shape of the impression 18 in the starch material 19 while fruit filling material 13 is still being injected. In FIG. 4 the center filling material 13 is no longer being injected and the piston is sucked back; however, the fruit snack jacket material 14 continues to be deposited and causes the deposited fruit filling material 23 to begin to separate from the fruit filling material 13 still within the inner nozzle 11 as shown in FIG. 5. The material connecting the deposited center filling 23 to the center filling 13 still within nozzle 11 that narrows first to a neck 21 and then an even finer connection 22 as shown in FIGS. 4 and 5.

Figure 6:
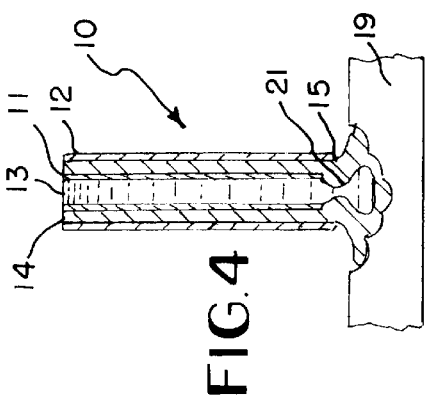
FIG. 6 shows the conclusion of the product deposition process with the confection resting in a starch impression.
Figure 7:
FIG. 7 shows an example of a completed snack confection according to the present invention.

Finally, as shown in FIG. 6 the depositing of both the center filling material 13 and the snack jacket material 14 is halted, and the starch tray 19 and the starch impression 18 is moved away from the deposition nozzle 10, or outlet nozzle, leaving a snack confection 20, such as a fruit snack confection, with a filing 23 in place. Furthermore after the snack confection 20 is free from the nozzle, it may be cooled. The cooled and/or conditioned product then goes to packing machines 64 and/or further processing stations.

During the deposition process as shown in FIGS. 1 and 2, the jacket material 14 will begin being deposited prior to commencing deposition of the center material 13. The deposition of the center material 13 will preferably accelerate relatively slowly and cut off quickly to cut off neck 21 and provide for relatively complete coverage of the center material 13 by the jacket material 14 and a desirably shaped product. A processor, such as a computer type device may be utilized to control the rates of deposition as well as the rates of acceleration and deceleration of the deposited materials.

The jacket material 14 will commence being deposited at a predetermined time by moving the center piston from a first toward a second position. At a second predetermined time which is after the first predetermined time, the center material 13 begins to be deposited by moving inner piston from first toward a second position. It has been found that the rate of the deposition of the jacket material 14 must be greater than the rate of deposition than the center material 13. At a third predetermined time, when the inner piston located its second position, the center material 13 will cease to be deposited. In the preferred embodiment the inner piston which activates the deposition from the center nozzle will then be displaced a small distance at a rapid rate in the opposite direction slightly back toward the first position in order to suck back some of the center material 13 from within the nozzle 11. After a brief pause, the inner piston will continue to travel back to its starting first position. At a fourth predetermined time, after the third predetermined time and the backing of the inner piston to create the suck back effect, the jacket material will cease to be deposited. The fourth predetermined time is subsequent to the third predetermined time. Additionally, after a brief pause, it has been found effective to slightly withdraw the outer piston a small distance at a rapid rate to create a suck back effect of the jacket material 14 from the nozzle 12 in order to break the connection between the jacket material 14 in outer nozzle 12 and the deposited confection 20 to create a properly shaped confection. Then the outer piston is returned to its original first position to begin the process again.

The snack jacket 24 typically begins to jell and solidify as a result of cooling and the jelling action of the gelatin and/or pectin contained in that material. The center filling 23 may firm to a paste-like consistency as a result of the combination of the cooling of the confection 20 and the jelling of the pectin in the presence of food grade acid for the jam-like filling. Alternatively, the center filling 23 may firm to any other desired consistency utilizing cooling and other processes. Furthermore, the center filling 23 may firm only slightly, if at all, in a liquid or juice filled snack. The confection 20 will remain in its starch tray 19 for a period of time, usually between about 24 to about 48 hours. One conditioning method allows for conditioning at about 70° F. for approximately two hours followed by conditioning at 100° F. for 18 hours, and finally conditioned at 68° F. for four hours. Thereafter, the snack confection 20 may be removed from the starch tray 19 and packaged in the same fashion as other small snack pieces. One method of removing the snack confection 20 from the starch tray is to dump the tray 19, sift the confection 20 from the starch and polish and package the confection pieces.

The oiler is a drum which continuously "oils" the confection 20. Cooled candy is polished in the drum with a mixture of mineral oil, carnauba wax, and flavor. Approximately 1.5 pounds of polish has been found effective at finishing approximately 1000 pounds of candy.

The snack jacket 24 may have greater viscosity than the center filling 23 throughout the depositing and cooling process and thereby tend to retain the center filling 23 in place. The center filling 23 will also preferably have about the same specific gravity as the jacket 24 to reduce the tendency of the filling 23 to migrate upwards or downwards in the confection. To control the specific gravity of center filling 23 in the snack confections 20. Automated analog mass flow meters and pumps, which use measures of specific gravity to determine flow, are used to analyze the materials provided to the extruder. These meters are able to measure the jacket material 14 and the center filling 13 specific gravities to within 0.25%, thus providing precise control, if not extremely precise control, of production. Based on the output of these meters, a computer may control the cooking temperatures, timing, addition of ingredients to one or both of the jacket material 14 or the center filing 13, or other sub process to control the specific gravity of at least one of the jacket material or the center material. By controlling the specific gravities through instrumentation and a computer and/or processor, similar specific gravities can be ensured at the time the confection 20 is deposited in the tray. Control will allow the machinery to maintain the specific gravities of the center and jacket materials within 1% and preferably within 0.25% of each other. Furthermore, instrumentation will allow for precise control of the amount of jacket and center material deposited to within a fraction of a milliliter volume per millisecond interval. Precise timing and metering ensures that the center filling 23 is placed at the desired location relative to the jacket material 24, i.e, such as the center of the confection 20.

The specific gravities of the center 23 and the jacket 24 at the time of deposition should be similar. For a 2% fill of center relative to the jacket material, up to a 3% of difference between the specific gravities has been found tolerable. For an 18% center fill, a specific gravity difference of only about 0.5% has been found tolerable to consistently produce confections 20 wherein the center material 13 is maintained within the outer jacket 24.

In an alternatively preferred embodiment, the center material 13 may be pumped to a conventional coextruder die head and continuously co-extruded with the jacket material 14 on a moving continuous belt rather than co-deposited in molds. The candy 20 may then be crimped and cut from the die head via an ultrasonic cutter 60 and fed to a cooling tunnel 62. From the cooling tunnel 62, the candy 20 preferably proceeds to the bagging line where it is bagged. A caser then cases the bagged product where the candy 20 is packed and shipped.

Figure 9:
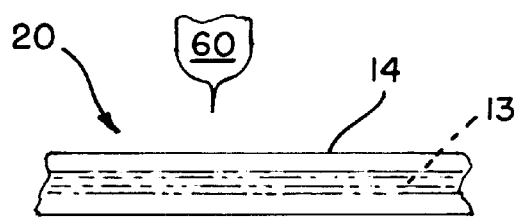
FIG. 9 is a plan view of a cutter positioned above an extruded confection.
Figure 10:
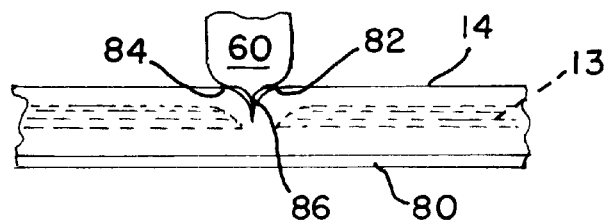
FIG. 10 is a plan view of the cutter starting the cutting process through the confection of FIG. 9.
Figure 11:
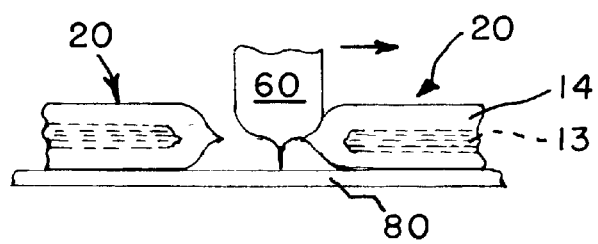
FIG. 11 is a plan view of the cutter separating two confection portions completing the cutting process of FIG. 10.

When using a coextruder instead of a depositor where the candy 20 comprises distinct jackets and centers such as the type taught herein, one effective method for cutting a continuous stream of confection into discrete units is to utilize an ultrasonic cutter 60 shown in operation in FIG. 9–11. FIG. 9 shows the ultrasonic cutter in a first position with a continuous stream of candy 20 below. The candy 20 has an outer jacket portion 14 and an interior center filling 13 shown in phantom. The cutter 60 is not energized with ultrasonic energy at this point in time. The cutter will compress a portion of the candy 20 as it is pushed towards the moving conveyor 80. This causes the top and bottom jacket portion 14 to come together. The candy 20 and jacket 14 is still hot at this point in time. Shoulders 82 and 84 of the cutter 60 may assist in compressing closed the ends of the jacket material around the center material. The cutter 60 may travel in the direction of extrusion at a higher speed than the extrusion rate so as to separate the cut candy 20 pieces a predetermined distance. During the cutting and separation process or at the end of the separation process, the ultrasonic cutter 60 is energized and retracted towards the starting position illustrated in FIG. 9. The ultrasonic cutter 60 is not energized until after the top and bottom portions of jacket material 14 have been compressed together. This process may then be repeated. Additionally, a plurality of cutters 60 may be utilized for a given application.

After separating two portions of candy 20 the separated candy portion will preferably be accelerated in the direction of travel of the extruded confection at a higher rate than the rate of extrusion such that sections of candy 20 are separated from one another for further treatment such as cooling, conditioning and/or packaging down stream.

Often the jacket 24 and center 23 are both largely comprised of fruit juices, corn syrup, and sugar. The viscosity differences in the jacket 24, or shell, and filling 23 typically result from the center filing 23 having much less, if any, food starch, and other variations in ingredients. For the maximum customer appreciation of the variation in texture and flavors, it is believed it would be desirable that the center filling 23 compose as much as 40% or 50% of the weight of the entire It confection 20. However, as a practical matter, because the snack jacket 24 must encompass substantially all of the center 23 and the limitations of mass production equipment, the center 23 will usually comprise less than 25% by weight of the entire confection 20. The typical center material range is about 10–20%, and preferably 13–14%, by weight of the entire confection 20. Individual snack confection pieces made according to the present invention would typically weigh between 4.5 and 7 grams.

EXAMPLES

The following Examples further illustrate the present invention in detail but are not to be construed to limit the scope thereof. Example 1 provides a two component soft candy having a jam-like filled center. Example 2 provides a two component soft candy having a liquid filled center.

Example 1

The jacket material 14 is comprised of corn syrup, sugar, gelatin, starch, high fructose corn syrup, and sodium citrate blended and cooked to 77% solids. Juice, acid, vitamins, color and flavor are added through pumps and mixed in the flow. Cooked jacket material 14 is monitored for specific gravity then dropped to a pump and hopper set at 180° F. The center material 13 is comprised of fruit filling material which may contain fruit juices, fruit puree, sugar, corn syrup, pectin, artificial colors, natural and artificial flavors, and other minor ingredients which are blended in an open kettle 40 and cooked to 77% solids. Pectin is a necessary ingredient as it will react with the later added food grade acid. The center material 13 is then pumped through a vacuum chamber to remove air bubbles and food grade acid is added prior to the center material 13 being dropped to a hopper 42 set at 135° F. Using a depositor 44, candy composed of jacket 14 and center materials 13 of substantially equivalent specific gravity is deposited into molds made into starch trays. The candy 20 is deposited such that the jam-like center 23 is completely surrounded by the jacket shell 24. The candy trays are then stacked and taken to conditioning rooms. The food grade acid reacts with the pectin in the center material to form a jam-like center which is semi-solid and does not tend to leak through the jacket shell 24. As the jacket shell 24 cools and is conditioned, it also becomes more solid and able to retain the center filling. After conditioning, the candy trays are dumped and sent to the oiler for polishing prior to boxing, casing, and warehousing.

Example 2

The jacket material 14 is comprised of corn syrup, sugar, gelatin, starch, high fructose corn syrup, and sodium citrate blended and cooked to 77% solids. Juice, acid, vitamins, color and flavor are added through pumps and mixed in the flow. Cooked jacket material 14 is then dropped to a pump and hopper set at 180° F. The center material 13 is comprised of sweetener, corn syrup, sorbitol, acid, natural and artificial flavors and coloring. The center is cooked to 78% solids. The center material 13 is then dropped to a pump and hopper 42 set at 90° F. Using a depositor 44, candy comprised of jacket 14 and center material 13 of substantially equivalent specific gravity is deposited into molds made into starch trays. The candy 20 is deposited such that the fluid center 23 is completely surrounded by the jacket shell 24. The candy trays are then stacked and taken to conditioning rooms where the jacket shell becomes more solid After conditioning, the candy trays are dumped and sent to the oiler for polishing prior to boxing, casing, and warehousing.

Thus while there have been described what are presently believed to be the preferred embodiments of the present invention, those skilled in the art realize that changes and modifications may be made thereto without departing from the spirit of the invention, and it is intended to claim all such changes and modifications as fall within the true scope of the invention.

We claim:

1. A multi component snack confection comprising:
    (a) a jacket comprising a jelling agent; and
    (b) a jellied center filling having pectin and a food grade acid as ingredients, wherein the jacket substantially surrounds the center filling and the combination of the pectin and the food grade acid contributes to the jelling of the center filling;
    (c) whereby a first specific gravity of the jacket and a second specific gravity of the center filling are similar; and
    (d) whereby the center filling comprises at least 10% of the weight of the confection.

2. The multi component snack confection of claim 1 wherein the first and second specific gravities are within 1% of one another.

3. The multi component snack confection of claim 1 whereby the center filling comprises at least 12% of the weight of the confection.

4. The multi component snack confection of claim 1 wherein the first and second specific gravities are within 0.25% of one another.

5. The multi component snack confection of claim 1 wherein the jacket further comprises a food grade starch.

6. The multi component snack confection of claim 1 wherein the center filling forms a paste-like consistency.

7. The multi component snack confection of claim 1 wherein the jacket is between about 60% to 85% solids.

8. The multi component snack confection of claim 1 wherein the center filling is between about 60% to 85% solids.

9. The multi component snack confection of claim 8 wherein the center filling is about 77% solids.

10. The multi component snack confection of claim 1 wherein the snack material jacket is about 77% solids.

11. The multi component snack confection of claim 1 wherein the jelling agent is selected from the group of pectin and gelatin.

12. A multicomponent snack confection comprising:
    (a) a soft jacket comprising a food grade starch and a jelling agent;
    (b) a center filling substantially surrounded by the jacket;
    (c) wherein a first specific gravity of the jacket and a second specific gravity of the center filling are substantially the same; and
    (d) the center filling comprises at least 10% of the weight of the confection.

13. The multicomponent snack confection of claim 12 wherein the jacket is further comprised of a mixture of a sweetener and fruit concentrate.

14. The multicomponent snack of claim 12 wherein the center filling is further comprised of a fruit product and a sweetener.

15. The multicomponent snack confection of claim 12 wherein the jacket is between about 60% to 85% solids.

16. The multicomponent snack confection of claim 15 wherein the center filling is about 77% solids.

17. The multicomponent snack confection of claim 12 wherein the center filling is further comprised of a food grade acid and pectin.

18. The multicomponent snack of claim 12 wherein the food grade starch is corn starch.

19. The multicomponent snack of claim 12 wherein the first and second specific gravities are within 1% of one another.

20. The multicomponent snack of claim 19 wherein the first and second specific gravities are within 0.25% of one another.

* * * * *